United States Patent Office 2,766,257
Patented Oct. 9, 1956

2,766,257

DI(OMEGA-CARBOXYALKYL)-TETRATHIO-CYCLODECANE

Frederick W. Holly, Cranford, and Claude F. Spencer, Chatham, N. J., assignors to Merck & Co., Inc., Rahway, N. J., a corporation of New Jersey No Drawing. Application September 8, 1954,
Serial No. 454,851

14 Claims. (Cl. 260—327)

This invention relates to compounds having α-lipoic acid activity.

α-Lipoic acid is a valuable growth stimulating crystalline substance which has been isolated from liver. This substance has the chemical name: 5-[3-(1,2-dithiacyclopentyl)] pentanoic acid and the formula:

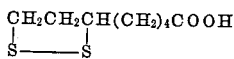

as is disclosed in the J. Am. Chem. Soc. 74, 3455 (1952).

According to the present invention there is provided a novel compound having the chemical name: 3,10-di-(4'-carboxy-butyl)-1,2,6,7-tetrathiacyclodecane and the formula:

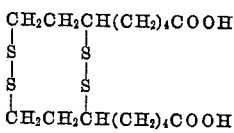

and salts and esters thereof. The DL-forms of such compounds possess activity equivalent to DL-α-lipoic acid and accordingly are of potential use as substitutes for α-lipoic acid. For purposes of brevity, the parent compound has been given the name tetrathianic acid and shall be referred to as such hereinafter. There is also provided by this invention novel processes of producing tetrathianic acid.

Production of tetrathianic acid may be conveniently attained by oxidation of 6,6'-dithio-bis(8-thioloctanoic acid) (I) or 8,8'-dithio-bis(6-thioloctanoic acid) (II) and esters thereof to the desired product. This process may be conveniently represented as follows:

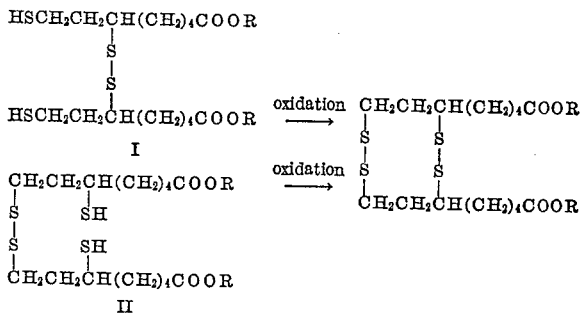

wherein R is hydrogen or a lower alkyl group.

The described oxidation process may be conveniently effected by contacting the starting material with a mild oxidizing agent in a suitable inert liquid reaction medium. Solvents such as alcohols like methanol, ethanol and isopropanol, propanol, chloroform and ethyl acetate, butyl acetate etc., and mixtures thereof, may be used satisfactorily for the reaction medium. Any mild oxidizing agent may be used for the oxidation but it is ordinarily preferred to employ for this purpose an aqueous mixture of iodine-potassium iodide, usually containing about 10% iodine. The reaction proceeds quickly at room temperature and ordinarily is completed in 10 to 30 minutes. After completion of the reaction excess iodine is removed, such as by treating the reaction mixture with sodium thiosulfate. The desired tetrathianic acid is then recovered from the reaction mixture by conventional means. One such isolation procedure consists in acidifying the reaction mixture, extracting if necessary with a water immiscible solvent, separating the immiscible layers and evaporating the organic solvent to dryness to isolate tetrathianic acid.

In addition to tetrathianic acid the process of this invention may be used to produce esters thereof such as the dimethyl, diethyl, dipropyl and dibutyl esters of tetrathianic acid by oxidation of the corresponding di-esters of 6,6'-dithio-bis(8-thioloctanoic acid) or 8,8'-dithio-bis-(6-thioloctanoic acid). These esters are also obtained from the parent acid by treatment with an equimolar quantity of a diazoalkane in ether.

Salts of tetrathianic acid are also provided by this invention and are produced by the reaction of tetrathianic acid with alkali metal and alkaline earth metal carbonates, bicarbonates and hydroxides in a suitable solvent such as water or aqueous mixtures of inert organic solvents, preferably solvents which are miscible with water such as the lower alcohols. In this manner salts such as the disodium and dipotassium salts of tetrathianic acid are produced.

The following example is added to illustrate but not to limit the invention.

EXAMPLE

*Tetrathianic acid*

A solution of 243 mg. of 6,6'-dithio-bis(8-thioloctanoic acid) in 100 ml. of chloroform was added dropwise to a stirred mixture of 25 ml. of chloroform and 25 ml. of water in a 3-necked flask. Concurrently, a solution of iodine in aqueous potassium iodide (10% iodine) was added dropwise in excess to the mixture. The slight excess of iodine present was reduced by the addition of 2 drops of sodium thiosulfate solution. The mixture was acidified to pH 2 with hydrochloric acid; the layers were separated and the aqueous layer was extracted with chloroform. The combined chloroform solutions were washed with water, dried over magnesium sulfate and concentrated under reduced pressure to give tetrathianic acid as a yellow oil. The product showed an ultraviolet absorption spectrum maximum at 3100 A. (E% 9.6). By enzymatic assay it was found to have activity equivalent to that of DL-α-lipoic acid.

The 6,6'-dithio-bis(8-thioloctanoic acid) may be prepared as follows:

(a) A solution of 11.4 g. of thioacetic acid and 20 g. of 7-carboethoxy-2-heptenoic acid is prepared and held at room temperature overnight. The solution is diluted with 100 ml. of chloroform and the chloroform layer washed with four portions of ice-water. The organic extract is dried over anhydrous magnesium sulfate and evaporated under reduced pressure to separate 3-acetylthio-7-carboethoxy heptanoic acid.

(b) Approximately 6.4 g. of thionyl chloride is added to 10 g. of 3-acetylthio-7-carboethoxy heptanoic acid. The solution is kept at room temperature overnight and the excess thionyl chloride is removed by concentration under reduced pressure.

Benzene is added to the residue and removed under reduced pressure; this is repeated and finally the 3-acetylthio-7-carboethoxy heptanoyl chloride is held under reduced pressure overnight to remove residual volatiles.

(c) To a suspension of 5.8 g. of sodium borohydride in 70 ml. of dioxane is added a solution of 8.5 g. of 3-acetylthio-7-carboethoxy heptanoyl chloride in 30 ml. of dioxane with stirring over a 15 minute period. An additional 2 g. of sodium borohydride is added and stirring continued for 2 hours at 20–25° C. The reaction mixture is cooled to below 10° C. and 30 ml. of water added as rapidly as possible. Cold aqueous hydrochloric acid is then added to bring the pH to about 2. The reaction mixture is diluted to 300 ml. with water and extracted with chloroform. The chloroform extract is washed with aqueous potassium bicarbonate and then water. The chloroform extract is dried and concentrated under reduced pressure to yield ethyl 6-acetylthio-8-hydroxyoctanoate in which is mixed some ethyl 6-thiol-8-hydroxyoctanoate.

(d) A 2.4 g. sample of the product formed in part (c) is added to a solution of 4 ml. of 30% aqueous sodium hydroxide in 10 ml. of methanol. A trace of zinc dust is added and the mixture refluxed for one hour. The solution containing the disodium salt of 6-thiol-8-hydroxyoctanoic acid is acidified with hydrochloric acid and extracted with chloroform. The chloroform extract is washed with aqueous potassium bicarbonate and the aqueous extract is acidified. It is extracted with chloroform and the chloroform is evaporated under reduced pressure to give 6-thiol-8-hydroxyoctanoic acid.

(e) An aqueous solution of about 12 g. of 6-thiol-8-hydroxyoctanoic acid is oxidized with 10% iodine—potassium iodide solution and the excess iodine is reduced with sodium thiosulfate. Isolation of 6,6'-dithio-bis(8-hydroxyoctanoic acid) from the reaction mixture is effected by extraction with ethyl acetate and extraction of the organic layer with saturated aqueous sodium bicarbonate. The bicarbonate extract containing the tetrasodium salt of 6,6'-dithio-bis(8-hydroxyoctanoic acid) is acidified to pH 3 with hydrochloric acid and extracted with ethyl acetate. The ethyl acetate extract is dried over sodium sulfate and evaporated to dryness under reduced pressure. The product has a neutralization equivalent of 109; calc. 191.

(f) About 4 g. of 6,6'-dithio-bis(8-hydroxyoctanoic acid), 3 g. of thiourea and 20 ml. of 40% aqueous hydrobromic acid are refluxed for 15 hours at 150° C. under a nitrogen atmosphere. To the reaction mixture containing 6,6' - dithio - bis{8-[2(2-thiopseudoureido)]octanoic acid} di-hydrobromide is made 0.5 N with sodium hydroxide and refluxed under nitrogen for 30 minutes. The mixture containing the tetra-sodium salt of 6,6'-dithio-bis(8-thioloctanoic acid) is then cooled and acidified to pH 3 with concentrated hydrochloric acid to form 6,6'-dithio-bis(8-thioloctanoic acid). The product is isolated by extraction with ethyl acetate, drying the extract over sodium sulfate, filtering and evaporation of the solvent under reduced pressure.

Various changes and modifications of the invention can be made and, to the extent that such variations incorporate the spirit of this invention, they are intended to be included within the scope of the appended claims.

What is claimed is:

1. A member of the group consisting of 3,10-di-(4'-carboxybutyl)-1,2,6,7-tetra-thiocyclodecane and lower alkyl esters, alkali metal salts and alkaline earth metal salts thereof.

2. 3,10-di-(4'-carboxybutyl) - 1,2,6,7 - tetrathiacyclodecane.

3. An alkali metal salt of 3,10-di-(4'-carboxybutyl)-1,2,6,7-tetrathiacyclodecane.

4. An alkaline earth metal salt of 3,10-di-(4'-carboxybutyl)-1,2,6,7-tetrathiacyclodecane.

5. A sodium salt of 3,10-di-(4'-carboxybutyl)-1,2,6,7-tetrathiacyclodecane.

6. A potassium salt of 3,10-di-(4'-carboxybutyl)-1,2,6,7-tetrathiacyclodecane.

7. A lower alkyl ester of 3,10-di-(4'-carboxybutyl)-1,2,6,7-tetrathiacyclodecane.

8. A methyl ester of 3,10-di-(4'-carboxybutyl)-1,2,6,7-tetrathiacyclodecane.

9. An ethyl ester of 3,10-di-(4'-carboxybutyl)-1,2,6,7-tetrathiacyclodecane.

10. The process which comprises reacting a member of the group consisting of 6,6'-dithio-bis(8-thioloctanoic acid), 8,8'-dithio-bis(6-thioloctanoic acid), and lower alkyl esters thereof with a mild oxidizing agent to produce a member of the group consisting of 3,10-di-(4'-carboxybutyl)-1,2,6,7-tetrathiacyclodecane and lower alkyl esters thereof.

11. The process which comprises reacting 6,6'-dithio-bis(8-thioloctanoic acid) with a mild oxidizing agent to produce 3,10-di-(4'-carboxybutyl)-1,2,6,7-tetrathiacyclodecane.

12. The process according to claim 11 in which the mild oxidizing agent is a mixture of potassium iodide and iodine.

13. The process which comprises reacting 8,8'-dithio-bis(6-thioloctanoic acid) with a mild oxidizing agent to produce 3,10-di-(4'-carboxybutyl)-1,2,6,7-tetrathiacyclodecane.

14. The process according to claim 13 in which the mild oxidizing agent is a mixture of potassium iodide and iodine.

No references cited.